(12) United States Patent
Niizuma (10) Patent No.: US 9,866,059 B2
(45) Date of Patent: Jan. 9, 2018

(54) WIRELESS POWER TRANSMISSION DEVICE AND WIRELESS POWER TRANSMISSION METHOD

(71) Applicant: IHI Corporation, Tokyo (JP)

(72) Inventor: Motonao Niizuma, Tokyo (JP)

(73) Assignee: IHI CORPORATION (JP)

( * ) Notice: Subject to any disclaimer, the term of this patent is extended or adjusted under 35 U.S.C. 154(b) by 390 days.

(21) Appl. No.: 14/488,784

(22) Filed: Sep. 17, 2014

(65) Prior Publication Data

US 2015/0001960 A1  Jan. 1, 2015

Related U.S. Application Data

(63) Continuation of application No. PCT/JP2013/057788, filed on Mar. 19, 2013.

(30) Foreign Application Priority Data

Mar. 26, 2012 (JP) .................... 2012-069247

(51) Int. Cl.
*G01B 7/14* (2006.01)
*H01F 38/14* (2006.01)
(Continued)

(52) U.S. Cl.
CPC ............ *H02J 7/025* (2013.01); *G01B 7/14* (2013.01); *H01F 38/14* (2013.01); *H02J 5/005* (2013.01);
(Continued)

(58) Field of Classification Search
CPC ................... H02J 5/005; H02J 50/60
(Continued)

(56) References Cited

U.S. PATENT DOCUMENTS

2008/0067874 A1  3/2008  Tseng .................. 307/104
2010/0123430 A1  5/2010  Kojima et al.
(Continued)

FOREIGN PATENT DOCUMENTS

CN      102195366 A    9/2011
JP      08-051137      2/1996
(Continued)

OTHER PUBLICATIONS

International Search Report and Written Opinion dated Apr. 16, 2013 in corresponding PCT International Application No. PCT/JP2013/057788.
(Continued)

*Primary Examiner* — Jared Fureman
*Assistant Examiner* — Aqeel Bukhari
(74) *Attorney, Agent, or Firm* — Ostrolenk Faber LLP (57) ABSTRACT

The wireless power transmission device is a wireless power transmission device which wirelessly transmits electric power between a power-transmitting coil and a power-receiving coil, and which includes: a metal member; a power supply unit which supplies the electric power to the power-transmitting coil; a measurement unit which measures a relative position of the power-receiving coil with respect to the power-transmitting coil; and a control unit which controls the power supply unit. The control unit adjusts the electric power based on the relative position measured by the measurement unit, so that an amount of induced current flowing through the metal member is decreased.

4 Claims, 5 Drawing Sheets

(51) Int. Cl.
*H02J 7/00* (2006.01)
*H02J 7/02* (2016.01)
*H02J 5/00* (2016.01)
*H02M 3/335* (2006.01)
*H02J 17/00* (2006.01)

(52) U.S. Cl.
CPC ............ *H02J 7/0063* (2013.01); *H02J 17/00* (2013.01); *H02M 3/33569* (2013.01)

(58) Field of Classification Search
USPC .......................................................... 307/104
See application file for complete search history.

(56) References Cited

U.S. PATENT DOCUMENTS

| | | | |
|---|---|---|---|
| 2010/0244580 A1 | 9/2010 | Uchida | ........................ 307/104 |
| 2010/0259217 A1 | 10/2010 | Baarman et al. | |
| 2011/0196544 A1* | 8/2011 | Baarman | ................. H02J 5/005 700/291 |
| 2011/0227420 A1 | 9/2011 | Urano | |
| 2012/0001485 A1 | 1/2012 | Uchida | ........................ 307/11 |
| 2012/0040613 A1 | 2/2012 | Nakano | |
| 2013/0082536 A1* | 4/2013 | Taylor | ..................... H02J 7/025 307/104 |

FOREIGN PATENT DOCUMENTS

| | | |
|---|---|---|
| JP | A-11-122832 | 4/1999 |
| JP | 2002-101578 | 4/2002 |
| JP | 2008-236916 | 10/2008 |
| JP | 2008-295274 | 12/2008 |
| JP | 2009-022126 | 1/2009 |
| JP | 2009-089463 | 3/2009 |
| JP | 2009-225551 | 10/2009 |
| JP | 2010-103200 | 5/2010 |
| JP | A-2010-119251 | 5/2010 |
| JP | 2010-130878 | 6/2010 |
| JP | 2010-141976 | 6/2010 |
| JP | 2010-141977 | 6/2010 |
| JP | 2010-158151 | 7/2010 |
| JP | 2010-183810 | 8/2010 |
| JP | 2010-239769 | 10/2010 |
| JP | 2011-182624 | 9/2011 |
| WO | WO 2010/116441 A1 | 10/2010 |

OTHER PUBLICATIONS

International Search Report dated Mar. 5, 2014 in PCT International Application No. PCT/2012/080888.
Extended European Search Report and European Search Opinion dated Oct. 13, 2015 in corresponding European Patent Application No. 13769917.9 (7 pages).
European Search Report, dated Jun. 29, 2015, issued in corresponding European Patent Application No. 12854472.3. Total 6 pages.

* cited by examiner

WIRELESS POWER TRANSMISSION DEVICE AND WIRELESS POWER TRANSMISSION METHOD

This application is a Continuation application based on International Application No. PCT/JP2013/057788, filed Mar. 19, 2013, which claims priority on Japanese Patent Application No. 2012-69247, filed Mar. 26, 2012, the contents of which are incorporated herein by reference.

TECHNICAL FIELD

The present invention relates to a wireless power transmission device and a wireless power transmission method which wirelessly perform power transmission.

BACKGROUND ART

A wireless power transmission device has various advantages that since the wirings (cables) to transmit electric power are not required, the operations of wiring connection are omitted, and that it is unnecessary to consider the durability of contact points and the contact failure. Accordingly, in recent years, the wireless power transmission device is not only used to transmit electric power in order to charge a battery which is provided in a consumer device such as a household electrical appliance, but is also used to transmit electric power in order to drive an industrial machine (for example, a stage, an arms, a crane, or a robot).

Patent Document 1 discloses a wireless power transmission device which wirelessly transmits electric power to a conveyance device of a semiconductor manufacturing apparatus. Specifically, the technology is disclosed in which when a carriage stops at a stop position which is set on the conveyance pathway as the movement route of the carriage, a voltage supply device provided at the stop position supplies electric power to the carriage in a stopped state using the operation of electromagnetic induction. In addition, Patent Documents 2 and 3 disclose wireless power transmission devices which wirelessly transmit electric power to a consumer device such as a mobile phone and to a movable body such as a vehicle.

DOCUMENT OF RELATED ART

Patent Document

[Patent Document 1] Japanese Patent Application, First Publication No. H8-51137
[Patent Document 2] Japanese Patent Application, First Publication No. 2008-236916
[Patent Document 3] Japanese Patent Application, First Publication No. 2009-225551

SUMMARY OF INVENTION

Technical Problem

In the usage of transmission of electric power to drive the industrial machines described above, power transmission may be performed from the wireless power transmission device to a power supply target device (a stage, an arm or the like) while a movable portion of the power supply target device is moving (for example, moving linearly or rotationally).

In addition, many of the power supply target devices described above include a metal member as a part thereof. However, in a case where electric power is transmitted to the movable portion, the movable portion moves, whereby the relative position of a power-receiving coil provided in the movable portion with respect to a power-transmitting coil of the wireless power transmission device is changed, and the distribution of the electromagnetic field which transmits electric power from the power-transmitting coil to the power-receiving coil is also changed. When the electromagnetic field approaches the metal member and the intensity of the electromagnetic field around the metal member rises, induced current may flow through the metal member. Therefore, not only may the efficiency of wireless power transmission be deteriorated, but also the metal member may be overheated, thereby causing the malfunction and failure of a device or a component which is attached to the metal member.

The present invention was made in view of the above circumstances, and an object thereof is to provide a wireless power transmission device and a wireless power transmission method which can reduce the amount of induced current flowing through a metal member even when the relative positional relationship between a power-transmitting coil and a power-receiving coil is changed, and which can suppress overheating of the metal member.

Solution to Problem

In order to solve the above problems, an aspect of the wireless power transmission device according to the present invention is a wireless power transmission device which wirelessly transmits electric power between a power-transmitting coil and a power-receiving coil, and which includes: a metal member; a power supply unit which supplies the electric power to the power-transmitting coil; a measurement unit which measures a relative position of the power-receiving coil with respect to the power-transmitting coil; and a control unit which controls the power supply unit. In addition, the control unit adjusts the electric power based on the relative position measured by the measurement unit, such that an amount of induced current flowing through the metal member is decreased.

An aspect of the wireless power transmission method according to the present invention is a wireless power transmission method of wirelessly transmitting electric power between a power-transmitting coil and a power-receiving coil, which includes: a first step of supplying the electric power to the power-transmitting coil; a second step of measuring a relative position of the power-receiving coil with respect to the power-transmitting coil; and a third step of adjusting the electric power based on the measured relative position such that an amount of induced current flowing through a metal member is decreased.

Effects of Invention

According to the present invention, a control unit adjusts electric power based on a relative position measured by a measurement unit, such that an amount of induced current flowing through a metal member is decreased. Therefore, even when the relative positional relationship between a power-transmitting coil and a power-receiving coil is changed and they approach the metal member, since the amount of induced current flowing through the metal member is decreased, it is possible to suppress overheating of the metal member.

DESCRIPTION OF EMBODIMENTS

Hereinafter, preferable embodiments of the present invention are described in detail with reference to the attached drawings. Similar portions in the drawings are given the same reference signs, and a duplicate description thereof is omitted.

Figure 1:
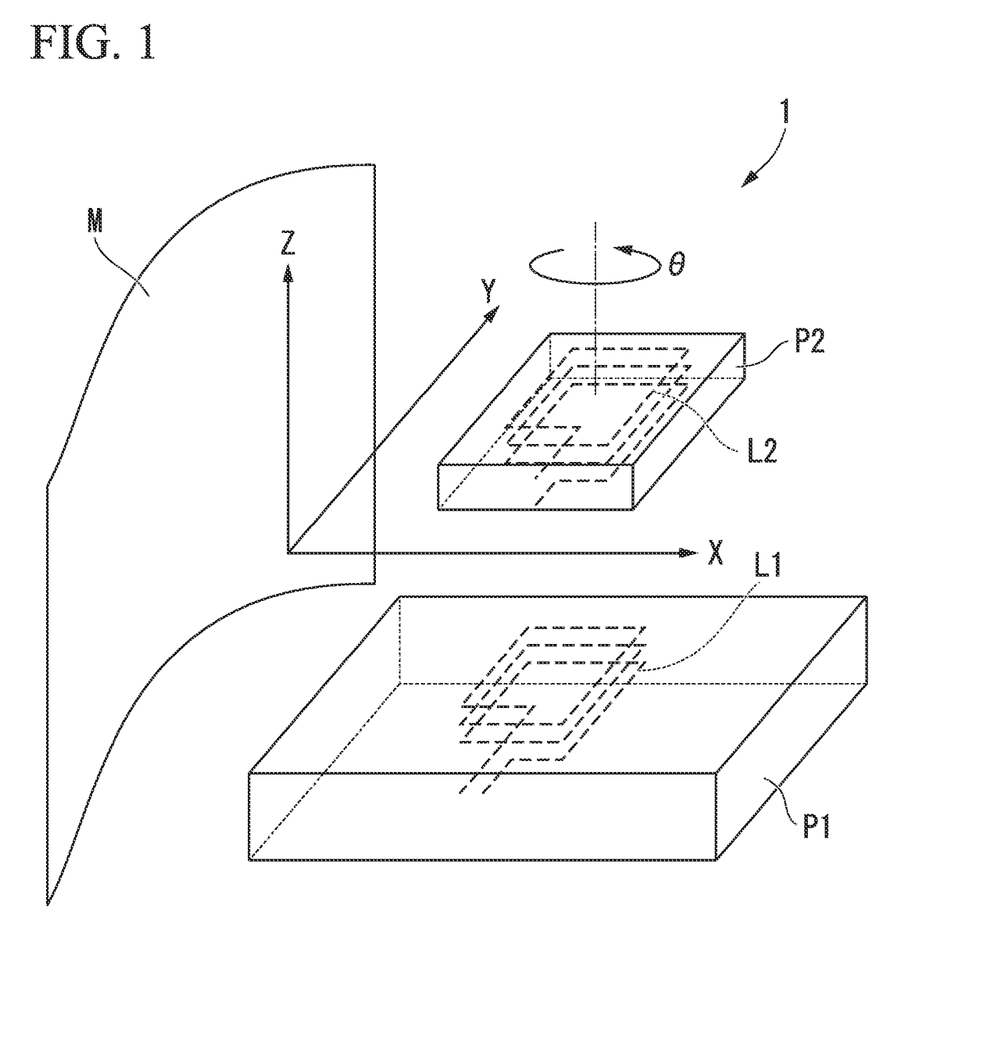
FIG. 1 is a diagram showing a usage configuration of a wireless power transmission device according to the present invention.

FIG. 1 is a diagram showing a usage configuration of a wireless power transmission device 1 according to the present invention.

In this diagram, the wireless power transmission device 1 includes a power-transmitting coil L1 and a power-receiving coil L2, and wirelessly transmits electric power from the power-transmitting coil L1 to the power-receiving coil L2.

The power-transmitting coil L1 and the power-receiving coil L2 shown in FIG. 1 are coils having planar shapes (shapes viewed in the Z-direction) which are rectangular shapes, and the coils are arranged to be close to each other, thereby forming an electromagnetic coupling circuit. The electromagnetic coupling circuit means a circuit in which the power-transmitting coil L1 and the power-receiving coil L2 are electromagnetically coupled together and the wireless power transmission from the power-transmitting coil L1 to the power-receiving coil L2 is performed. That is, the electromagnetic coupling circuit may be either of a circuit which performs power transmission in "electromagnetic induction type" and a circuit which performs power transmission in "electromagnetic field resonance type".

The power-transmitting coil L1 is provided in a fixed portion P1 in which the position and attitude thereof are fixed, and the power-receiving coil L2 is provided in a movable portion P2 in which the position and attitude thereof are movable. Therefore, the position and attitude of the movable portion P2 change, and thereby, the relative position and attitude between the power-transmitting coil L1 of the fixed portion P1 and the power-receiving coil L2 of the movable portion P2 are changed. In addition, in order to prevent excessive deterioration of the power transmission efficiency, the power-transmitting coil L1 of the fixed portion P1 is attached to a position approximately facing the power-receiving coil L2 within the movable area of the movable portion P2.

In this specification, "position" means a position in the X-direction, in the Y-direction, or in the Z-direction in the XYZ orthogonal coordinate system shown in FIG. 1, and "attitude" means a rotation around the X-axis, around the Y-axis, or around the Z-axis. In addition, "relative position" means "a relative position and a relative displacement amount in attitude".

In this embodiment, in order to simplify the description, the movable portion P2 is configured to have 3 degrees of freedom of the parallel movement in the XY plane (2 degrees of freedom) and the rotation around the Z-axis (1 degree of freedom). An apparatus provided with the fixed portion P1 and the movable portion P2 described above includes, for example, a stage device which moves an object which is placed thereon. That is, a stage configured to be capable of moving an object which is placed thereon is the movable portion P2, and a stage movement unit is the fixed portion P1, which moves the stage in parallel with the XY plane and which rotates the stage around the Z-axis.

In FIG. 1, a reference sign M represents a metal member. The metal member M is a metal structure or a metal component and is provided in one of or both of the fixed portion P1 and the movable portion P2.

Figure 2:
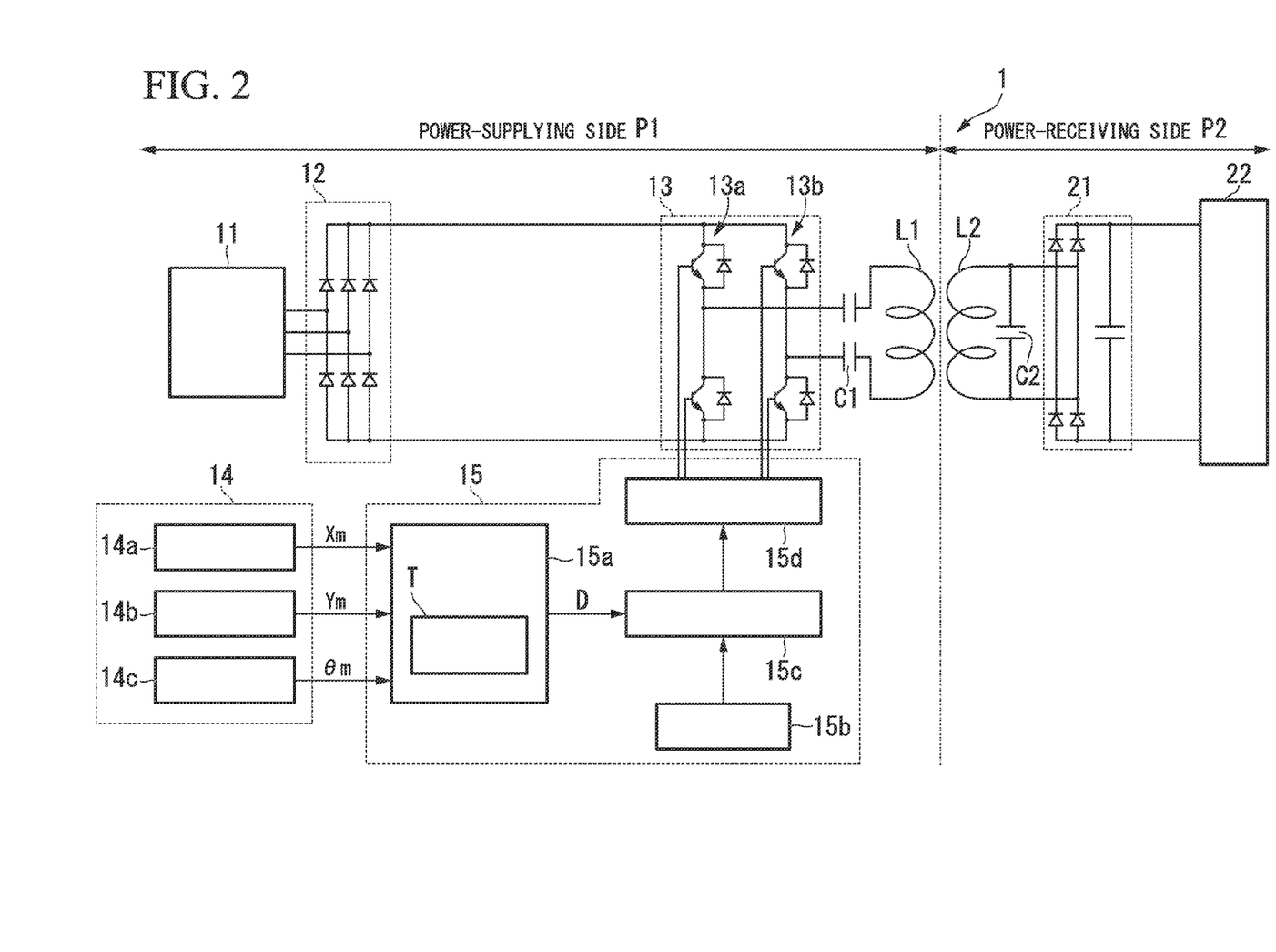
FIG. 2 is a block diagram showing a first embodiment of the wireless power transmission device according to the present invention.

FIG. 2 is a block diagram showing a first embodiment of the wireless power transmission device 1 according to the present invention.

As shown in this diagram, the wireless power transmission device 1 is roughly divided into a structure provided in the side of the fixed portion P1 (power-supplying side) and a structure provided in the side of the movable portion P2 (power-receiving side). The structure of the power-supplying side includes an external power source 11, a rectifier circuit 12, a power supply unit 13, a measurement unit 14, a control unit 15 and the like in addition to the power-transmitting coil L1. In contrast, the structure of the power-receiving side includes a power-receiving circuit 21 and the like in addition to the power-receiving coil L2. In addition, a load 22 provided in the power-receiving side is a load to which the wirelessly transmitted electric power is supplied, and which is a motor or the like included in a device mounted on the movable portion P2.

The external power source 11 supplies electric power which is required for the generation of electric power to be transmitted to the movable portion P2, for example, supplies three-phase AC power whose voltage is 200V. In addition, the external power source 11 is not limited to a three-phase AC power source and may be a commercial AC power source which supplies single-phase AC power.

The rectifier circuit 12 is a circuit which rectifies and converts, into DC power, AC power supplied from the external power source 11, and for example, as shown in FIG. 2, is realized by a three-phase full-wave rectifier circuit (a bridge rectifier circuit).

It is possible to employ a DC power source such as a fuel battery or a solar battery, as the external power source 11. In this case, the rectifier circuit 12 can be omitted.

The power supply unit 13 wirelessly transmits electric power to the movable portion P2 through the electromagnetic coupling circuit formed by the power-transmitting coil L1 and the power-receiving coil L2 provided in the movable portion P2, wherein the electric power is supplied from the rectifier circuit 12 to the power supply unit 13. Specifically, under the control of the control unit 15, the power supply unit 13 changes, into AC power, DC power supplied from the rectifier circuit 12, and supplies the AC power to the power-transmitting coil L1, thereby performing the wireless power transmission to the movable portion P2.

That is, the power supply unit 13 is a power conversion circuit which changes DC power supplied from the rectifier circuit 12 into AC power under the control of the control unit 15. The power supply unit 13 is realized by, for example, as shown in FIG. 2, a circuit in which switching legs 13a and 13b (each circuit composed of two transistors connected to each other in series, and of two diodes connected to the two transistors in parallel) are connected to each other in parallel. In this embodiment, a transistor is employed as an example, and a power control semiconductor element such as a power MOSFET (Metal Oxide Semiconductor Field Effect Transistor) or an IGBT (Insulated Gate Bipolar Transistor) may be employed.

Two capacitors C1 are provided between the power supply unit 13 and the power-transmitting coil L1. The capacitors C1 form a serial resonance circuit together with the power-transmitting coil L1. One end of the power-transmitting coil L1 is connected to the switching leg 13a of the power supply unit 13 through one capacitor C1, and the other end of the power-transmitting coil L1 is connected to the switching leg 13b of the power supply unit 13 through the other capacitor C1.

The measurement unit 14 includes three displacement measurement devices 14a to 14c and measures a relative position (relative positions and a relative displacement amount in attitude) of the power-receiving coil L2 with respect to the power-transmitting coil L1. The displacement measurement device 14a measures a displacement amount in position in the X-direction (Xm) among the above displacement. The displacement measurement device 14b measures a displacement amount in position in the Y-direction (Ym) among the above displacement. The displacement measurement device 14c measures a displacement amount in rotation angle in the rotational direction around the Z-axis (θm) among the above displacement. For the displacement measurement devices 14a and 14b, for example, it is possible to employ a magnetostrictive linear sensor, a magnescale, or a length-measuring device using an interference pattern of light. For the displacement measurement device 14c, it is possible to employ a rotary encoder, a resolver or the like.

The control unit 15 includes a transmission power selector 15a, an oscillation circuit 15b, a drive clock generation circuit 15c, and a driver control circuit 15d, and adjusts the electric power based on the relative position measured by the measurement unit 14 such that the amount of induced current flowing through the metal member M is decreased.

In this embodiment, the control unit 15 adjusts a duty D of the electric power between the power-transmitting coil L1 and the power-receiving coil L2, based on the relative position measured by the measurement unit 14, with reference to a duty table T (described below).

"Duty D" means the transmission ratio (%) of the actual transmission electric power to the maximum electric power which can be transmitted from the power-transmitting coil L1 to the power-receiving coil L2.

The transmission power selector 15a includes the duty table T which stores a duty D of electric power which corresponds to the relative position such that the amount of induced current flowing through the metal member M is decreased. The transmission power selector 15a determines a relative position of the power-receiving coil L2 with respect to the power-transmitting coil L1 based on a combination of displacement amounts (Xm, Ym, θm) which are output from the displacement measurement devices 14a, 14b, and 14c of the measurement unit 14, respectively, and determines and outputs a duty D of electric power at the above relative position.

Specifically, the transmission power selector 15a determines the duty D using the duty table T. In addition, the transmission power selector 15a is obtained by the cooperation between, for example, a microprocessor which includes a CPU (Central Processing Unit), a memory, and the like, and a program which carries out the operations of the transmission power selector 15a.

The power-receiving circuit 21 rectifies and converts, into DC power, AC power supplied from the power-receiving coil L2, and for example, as shown in FIG. 2, is realized by a three-phase full-wave rectifier circuit (a bridge rectifier circuit). In addition, between the power-receiving coil L2 and the power-receiving circuit 21, a capacitor C2 is connected to the power-receiving coil L2 in parallel.

Figure 3:
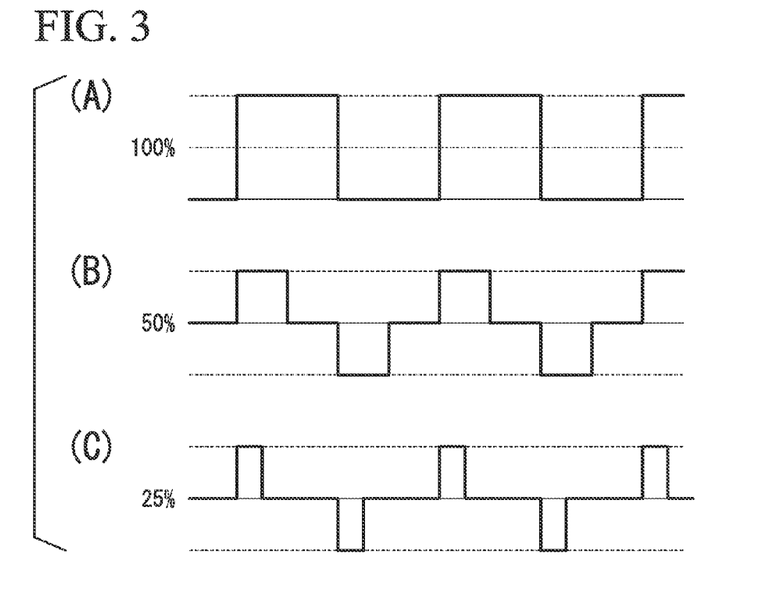
FIG. 3 is a diagram showing output waveforms of a power supply unit according to the first embodiment of the present invention.

FIG. 3 is a diagram showing output waveforms of the power supply unit 13 according to the first embodiment of the present invention.

In this diagram, a graph (A) shows a case where the duty D is 100%, a graph (B) shows a case where the duty D is 50%, a graph (C) shows a case where the duty D is 25%, and each graph shows a waveform of the switching leg 13a. In addition, the waveform of the switching leg 13b is a vertically inverted waveform of the above waveform.

In each graph, a central horizontal line shows a state where both of the upper and lower transistors are in non-conduction, an upper horizontal line shows a state where the upper transistor is in conduction, and a lower horizontal line shows a state where the lower transistor is in conduction.

In the graphs (A), (B) and (C) of FIG. 3, the cycles of the waveforms are the same, one of the upper and lower transistors is always in conduction in the graph (A), one of the upper and lower transistors is in conduction for 50% of the cycle in the graph (B), and one of the upper and lower transistors is in conduction for 25% of the cycle in the graph (C).

In this embodiment, the duty D is the ratio of the period in which the transistors of the switching legs 13a and 13b are in conduction, to the entire period, and the frequency is not changed. However, the frequency may be changed, together with the adjustment of the duty D.

The output waveform of the power supply unit 13 is output from the power-transmitting coil L1, and thereby, it is possible to control the transmission electric power between the power-transmitting coil L1 and the power-receiving coil L2.

Figure 4:
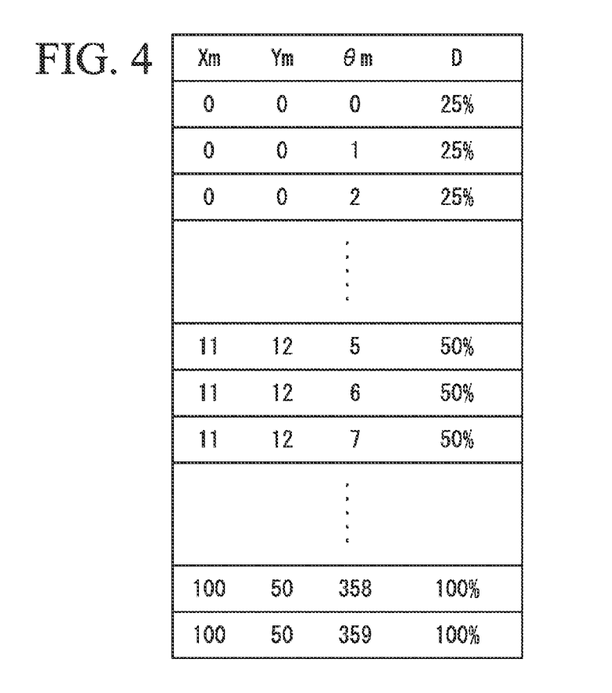
FIG. 4 is a diagram showing an example of a duty table.

FIG. 4 is a diagram showing an example of the duty table T.

As shown in this diagram, the duty table T shows the relationship between the relative positions and the relative displacement amount in attitude (Xm, Ym, θm) of the movable portion P2 with respect to the fixed portion P1, and the duty D. The duty table T is set beforehand based on a relative distance between the metal member M and the electromagnetic field which occurs between the power-transmitting coil L1 and the power-receiving coil L2, with reference to the result of tests or simulations which have been carried out beforehand.

The duty table T shown in FIG. 4 is a table in a case where values of the relative positions and the relative displacement amount in attitude of the movable portion P2 with respect to the fixed portion P1 are within the range of 0 to 100 mm in the X-direction, within the range of 0 to 50 mm in the Y-direction, and within the range of 0 to 359° in the rotational direction around the Z-axis. As shown in this diagram, in the duty table T, a duty D is set for each of the combinations of displacement amounts (Xm, Ym, θm). For example, in the case where the displacement amounts (Xm, Ym, θm) are 11 mm, 12 mm, and 6°, the duty D is set at 50%.

In the duty table T shown in FIG. 4, the displacement amounts Xm and Ym are set at every 1 mm, and the displacement amount θm is set at every 1°. Therefore, the number of the combinations of theses displacement amounts (Xm, Ym, θm) becomes enormous, and the preparation of the duty table T requires time and effort. In order to reduce the time and effort, it is possible to prepare and use a table in which the increments of displacement amounts (Xm, Ym, θm) are set greater and the relationship between displacement amounts (Xm, Ym, θm) and duties D is set discretely. For example, it is possible to use a table in which the displacement amounts Xm and Ym are set at every 10 mm and the displacement amount θm is set at every 10°. In this case, with respect to intermediate positions being within the interval of 10 mm or of 10°, it is possible to complement and obtain duties D by the linear interpolation or the like using the values being set at every 10 mm or at every 10°.

In a case where the duty table T shown in FIG. 4 is used, the transmission power selector 15a refers to the duty table T and determines the duty D which corresponds to the combination of the displacement amounts (Xm, Ym, θm) output from the displacement measurement devices 14a, 14b, and 14c, respectively. That is, the transmission power selector 15a determines the duty D only by searching the duty table T.

The duty D of the duty table T is set beforehand such that the amount of induced current flowing through the metal member M is decreased. That is, with respect to positions within the movable area of the movable portion P2, the duty table T is created beforehand based on whether or not the electromagnetic field which performs the wireless power transmission between the power-transmitting coil L1 and the power-receiving coil L2 is close to the metal member M.

For example, in FIG. 1, when the movable portion P2 is positioned in left in this diagram, the electromagnetic field which performs the wireless power transmission from the power-transmitting coil L1 to the power-receiving coil L2 is close to the metal member M. Accordingly, in order to greatly decrease the electric power of the wireless power transmission, the duty D of the output of the switching legs 13a and 13b is set at, for example, 25%.

When the movable portion P2 is positioned in the middle between right and left in this diagram, the electromagnetic field which performs the wireless power transmission from the power-transmitting coil L1 to the power-receiving coil L2 is slightly close to the metal member M. Accordingly, in order to slightly decrease the electric power of the wireless power transmission, the duty D of the output of the switching legs 13a and 13b is set at, for example, 50%.

When the movable portion P2 is positioned in right in this diagram, the electromagnetic field which performs the wireless power transmission from the power-transmitting coil L1 to the power-receiving coil L2 is away from the metal member M. Accordingly, it is unnecessary to decrease the electric power of the wireless power transmission, and the duty D of the output of the switching legs 13a and 13b is set at, for example, 100%.

The value of the duty D (25% or 50%) during the decrease of the electric power is an example, and another value may be adopted if the overheating of the metal member M can be prevented.

The measurement unit 14 measures a relative position of the power-receiving coil L2 with respect to the power-transmitting coil L1, and if the electromagnetic field at the relative position is close to the metal member M, the duty D of the electric power of the wireless power transmission is decreased based on the duty table T.

Accordingly, by adopting this configuration, it is possible to suppress the overheating of the metal member M, thereby preventing the malfunction and failure of a device or a component which is attached to the metal member M, and to reduce the waste of energy.

Figure 5:
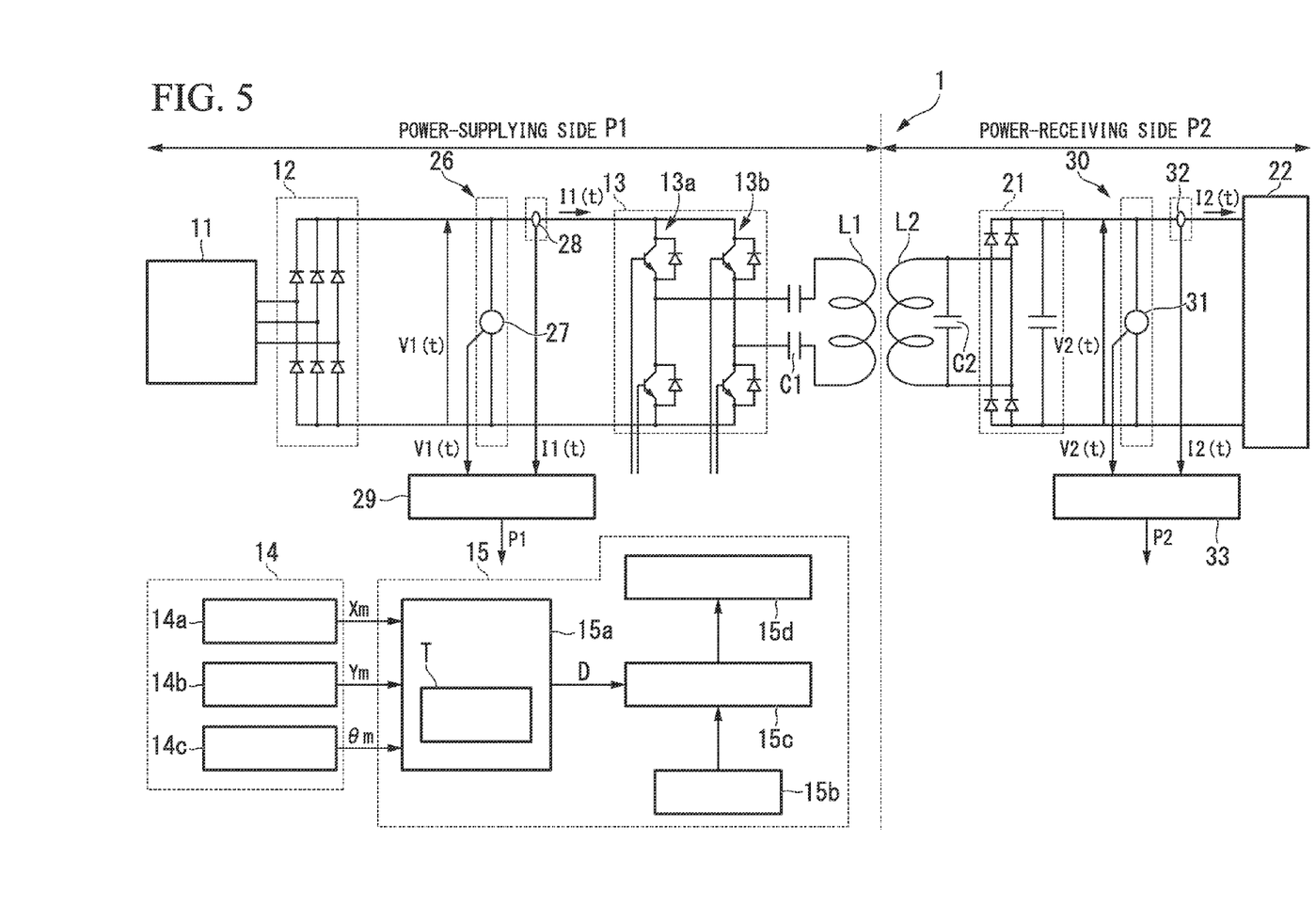
FIG. 5 is a block diagram showing a second embodiment of the wireless power transmission device according to the present invention.

FIG. 5 is a block diagram showing a second embodiment of the wireless power transmission device 1 according to the present invention.

In this embodiment, the wireless power transmission device 1 of the present invention includes a transmission power measurement circuit 26 and a received power measurement circuit 30.

The transmission power measurement circuit 26 includes a voltage measurement unit 27 which measures a voltage V1 (t) between power-supplying buses, a current measurement unit 28 which measures a current I1 (t) in the power-supplying bus, and an electric power amount-computing unit 29 which computes a transmission electric power amount p1 (=V1 (t)×I1 (t)) from the voltage V1 (t) and the current I1 (t). The transmission power measurement circuit 26 measures the transmission electric power amount p1 which is transmitted by the power-transmitting coil L1.

The received power measurement circuit 30 includes a voltage measurement unit 31 which measures a voltage V2 (t) between power-receiving buses, a current measurement unit 32 which measures a current I2 (t) in the power-receiving bus, and an electric power amount-computing unit 33 which computes a received electric power amount p2 (=V2 (t)×I2 (t)) from the voltage V2 (t) and the current I2 (t). The received power measurement circuit 30 measures the received electric power amount p2 which is received by the power-receiving coil L2.

It is preferable that the received electric power amount p2 be sent to the power-supplying side through a wireless communication device (not shown).

The duty table T is set based on the transmission efficiency of electric power at a relative position of the power-receiving coil L2 with respect to the power-transmitting coil L1.

Since the electromagnetic field is invisible, it is difficult to determine whether or not the electromagnetic field is close to the metal member M at each position of the movable portion P2.

Accordingly, in this embodiment, the movable portion P2 is moved throughout the movable area thereof while the transmission efficiency of the received electric power amount p2 to the transmission electric power amount p1 (p2/p1) is measured using the transmission power measurement circuit 26 and the received power measurement circuit 30. The transmission efficiency is calculated at each relative position of the power-receiving coil L2 with respect to the power-transmitting coil L1, and the position at which the transmission efficiency is low is stored in the duty table T, as the position at which the duty D of the electric power is decreased.

In the second embodiment shown in FIG. 5, the position of the movable portion P2 is changed in the X-direction, in the Y-direction, or in the θ-direction by a certain amount, the transmission efficiency is measured at each position, and for example, the duty D at each position is determined as follows:

If the transmission efficiency is 80% or more (corresponding to a case where the electromagnetic field is away from the metal member M): the duty D=100%

If the transmission efficiency is 60% or more and less than 80% (corresponding to a case where the electromagnetic field is slightly close to the metal member M): the duty D=50%

If the transmission efficiency is less than 60% (the electromagnetic field is close to the metal member M): the duty D=25%

The X-position, the Y-position, and the θ-position are changed within the movable area at regular intervals (the same intervals as the mesh of the duty table T), the contents of the duty table T are filled, and values are stored in the duty table T.

The above-described values are an example, and other values may be adopted if the effects of the present invention can be obtained.

If the sizes, structures, and layouts of components are not changed, it is unnecessary to change the contents of the duty table T. Therefore, the transmission power measurement circuit 26 and the received power measurement circuit 30 may be removed after the contents of the duty table T have been created.

In addition, while the configuration of FIG. 5 is maintained, when the sizes, structures, and layouts of the components are changed, the contents of the duty table T may be renewed through the same operations as described above.

According to the above-described configuration, the same effects as in the first embodiment can be obtained without correctly determining the electromagnetic field distribution through simulation or the like and without measuring the distribution using a measurement device.

Figure 6:
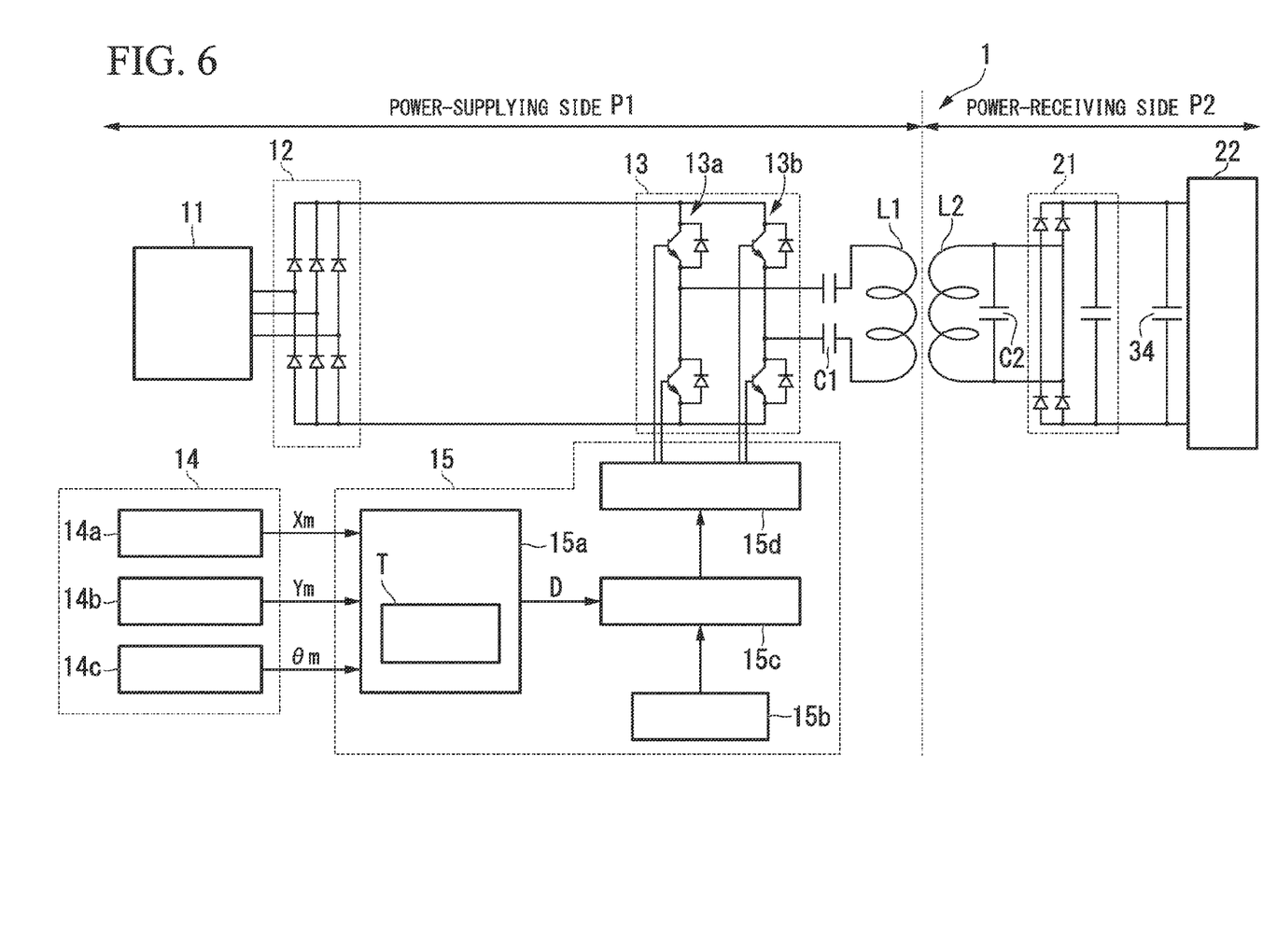
FIG. 6 is a block diagram showing a third embodiment of the wireless power transmission device according to the present invention.

FIG. 6 is a block diagram showing a third embodiment of the wireless power transmission device 1 according to the present invention.

In this embodiment, a power storage component 34 is provided in the power-receiving side.

In a case where the power supply to the load 22 may run short at the position at which the transmission power is decreased (the position at which the duty D is small), and the power storage component 34 (a secondary battery such as a lithium-ion battery or a nickel-hydrogen battery, an electric double-layer capacitor, an electrolytic capacitor or the like) is added into the power-receiving side. At the position at which the transmission power is not decreased (the position at which the duty D is large), electric power is stored in the power storage component 34, and at the position at which the transmission power is decreased, the power supply to the load 22 is supplemented by discharging the power storage component 34.

The other structures are the same as in the first embodiment.

According to the above-described devices and methods of the present invention, the control unit 15 adjusts the electric power based on the relative position measured by the measurement unit 14 such that the amount of induced current flowing through the metal member M is decreased. Therefore, even when the relative positional relationship between the power-transmitting coil L1 and the power-receiving coil L2 is changed and they approach the metal member M, the amount of induced current flowing through the metal member M is decreased, and thus, it is possible to suppress the overheating of the metal member M.

The shape, the combination or the like of each component shown in the above-described embodiments is an example, and additions, omissions, replacements, and other modifications of configurations can be adopted within the scope of and not departing from the gist of the present invention. The present invention is not limited to the above descriptions and is limited only by the scopes of the attached claims.

For example, in the above embodiments, both planar shapes of the power-transmitting coil L1 and the power-receiving coil L2 are rectangular shapes. However, if possible to perform the wireless power transmission, the shape of the coil may be an optional shape such as a circular shape or an elliptic shape. The shapes of the power-transmitting coil L1 and of the power-receiving coil L2 may be different from each other.

INDUSTRIAL APPLICABILITY

According to the present invention, a control unit adjusts electric power based on a relative position measured by a measurement unit such that an amount of induced current flowing through a metal member is decreased. Therefore, even when the relative positional relationship between a power-transmitting coil and a power-receiving coil is changed and they approach the metal member, the amount of induced current flowing through the metal member is decreased, and thus, it is possible to suppress overheating of the metal member.

The invention claimed is:

1. A wireless power transmission device which wirelessly transmits electric power between a power-transmitting coil provided in a fixed portion and a power-receiving coil provided in a movable portion, comprising:
   a power supplier which supplies the electric power to the power-transmitting coil;
   a controller which controls the power supplier; and
   a measurer which measures a relative position of the power-receiving coil with respect to the power-transmitting coil,
   wherein the controller includes a duty table which stores a duty of the electric power, the duty being set based on the relative position such that an amount of induced current flowing through a metal member is decreased, and the metal member being provided in a predetermined position of one or both of the fixed portion and the movable portion, and
   wherein the controller is configured to adjust a duty of the electric power based on the relative position, with reference to the duty table.

2. The wireless power transmission device according to claim 1, wherein the duty table is set beforehand based on a relative distance between the metal member and an electromagnetic field which occurs between the power-transmitting coil and the power-receiving coil.

3. The wireless power transmission device according to claim 1, further comprising:
   a transmission power measurement circuit which measures a transmission electric power amount which is transmitted by the power-transmitting coil; and
   a received power measurement circuit which measures a received electric power amount which is received by the power-receiving coil,
   wherein the duty table is set based on transmission efficiency of the electric power at the relative position.

4. A wireless power transmission method of wirelessly transmitting electric power between a power-transmitting coil provided in a fixed portion and a power-receiving coil provided in a movable portion, the wireless power transmission method for a wireless power transmission device including a metal member, comprising:
   a first step of supplying the electric power to the power-transmitting coil;

a second step of measuring a relative position of the power-receiving coil with respect to the power-transmitting coil; and a third step of adjusting a duty of the electric power based on the measured relative position, with reference to a duty table which stores a duty of the electric power, the duty stored in the duty table being set based on the relative position such that an amount of induced current flowing through the metal member is decreased, the metal member being provided in a predetermined position of one or both of the fixed portion and the movable portion.

\* \* \* \* \*